United States Patent
Fu

(10) Patent No.: US 12,298,413 B2
(45) Date of Patent: May 13, 2025

(54) NEIGHBORING CELL MEASUREMENT METHOD AND APPARATUS

(71) Applicant: GUANGDONG OPPO MOBILE TELECOMMUNICATIONS CORP., LTD., Guangdong (CN)

(72) Inventor: Zhe Fu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 462 days.

(21) Appl. No.: 17/730,170

(22) Filed: Apr. 26, 2022

(65) Prior Publication Data

US 2022/0252736 A1 Aug. 11, 2022

Related U.S. Application Data

(63) Continuation of application No. PCT/CN2019/115111, filed on Nov. 1, 2019.

(51) Int. Cl.
| | |
|---|---|
| *G01S 19/25* | (2010.01) |
| *H04W 24/10* | (2009.01) |
| *H04W 64/00* | (2009.01) |
| *H04W 84/06* | (2009.01) |

(52) U.S. Cl.
CPC ............ *G01S 19/256* (2013.01); *H04W 24/10* (2013.01); *H04W 64/006* (2013.01); *H04W 84/06* (2013.01)

(58) Field of Classification Search
CPC .... G01S 19/256; H04W 24/10; H04W 64/006

USPC ....................................................... 455/456.1
See application file for complete search history.

(56) References Cited

U.S. PATENT DOCUMENTS

| | | | |
|---|---|---|---|
| 2018/0324678 A1 | 11/2018 | Chen et al. | |
| 2019/0222327 A1* | 7/2019 | Lin | ........................ H04W 24/10 |

FOREIGN PATENT DOCUMENTS

| | | |
|---|---|---|
| CN | 1859721 | 11/2006 |
| CN | 102625353 | 8/2012 |
| CN | 109600770 | 4/2019 |
| CN | 112312451 | 2/2021 |
| EP | 4007349 A1 | 6/2022 |
| WO | 2020067973 A1 | 4/2020 |
| WO | WO-2021017690 A1 * | 2/2021 ........... H04B 7/1851 |

OTHER PUBLICATIONS

English translation of WO 2021017690 A1 (Year: 2021).*

(Continued)

*Primary Examiner* — Ted M Wang
(74) *Attorney, Agent, or Firm* — Hodgson Russ LLP

(57) ABSTRACT

The present disclosure provides a neighboring cell measurement method, comprising: receiving SMTC information; and determining an SMTC window according to a positioning capability of a terminal device and the SMTC information, the SMTC window being used to perform a neighboring cell measurement. In this way, a terminal device having positioning capabilities meeting the requirement can more accurately determine a neighboring-cell signal delay on the basis of its own positioning capabilities, without having to extend an SMTC window to eliminate the impact of signal delay calculation errors.

18 Claims, 4 Drawing Sheets

(56) References Cited

OTHER PUBLICATIONS

EPO, Extended European Search Report for EP Application No. 19950735.1, Oct. 10, 2022.
CATT, "Measurement Issues for NTN System," 3GPP TSG-RAN WG2 Meeting #107bis, R2-1912157, Oct. 2019.
Ericsson, "SMTC configuration for RRC_IDLE and RRC_INACTIVE states," 3GPP TSG-RAN WG2 AH-1801, Tdoc R2-1800351, Jan. 2018.
EPO, Summons to Attend Oral Proceedings for EP Application No. 19950735.1, Nov. 15, 2023.
Ericsson, "Enhancements to initial access procedure," 3GPP TSG-RAN WG1 Meeting #97, R1-1907455, May 2019.
Nokia et al., "UE Positioning in NTN," 3GPP TSG RAN WG1 Meeting #96bis, R1-1904665, Apr. 2019.
WIPO, International Search Report and Written Opinion for PCT/CN2019/115111, Aug. 5, 2020.
EPO, Communication for EP Application No. 19950735.1, Jul. 19, 2023.
CATT, "The Impact by Propagation Delay Difference on Connected Mode Measurements," 3GPP TSG-RAN WG2 Meeting #107, R2-1908755, Aug. 2019.
CNIPA, First Office Action for CN Application No. 202310598609.2, Aug. 25, 2024.

* cited by examiner ial Patent
NEIGHBORING CELL MEASUREMENT METHOD AND APPARATUS

RELATED APPLICATION

This application is a continuation of International Patent Application No. PCT/CN2019/115111, filed Nov. 1, 2019, the entire disclosure of which is incorporated herein by reference.

TECHNICAL FIELD

The present disclosure relates to the field of communication, and more particularly, to a method and apparatus for measuring a neighbor cell.

BACKGROUND

Non-terrestrial networks (NTN) are a communication scenario of the fifth generation (5G) mobile communication systems. In the NTNs, network devices that receive signals sent by terminal devices are no longer base stations fixed on the ground, but network devices located in the air, such as satellites.

The satellites are moving very fast, causing distances between the satellites and the terminal devices located on the ground to change very quickly. For example, distances between low earth orbit (LEO) satellites and the terminal devices can change at a rate of up to 7 kilometers per second (km/s).

In some cases, the terminal devices need to receive and measure signals of a plurality of NTN cells (e.g., satellites) for cell selection or cell reselection, and the network devices can notify the terminal devices of relevant configuration information for cell selection or cell reselection by broadcast. For example, the network devices may notify the terminal devices to receive information such as time windows for receiving SS/PBCH blocks (SSBs) of neighbor cells by broadcasting SS/PBCH block measurement timing configuration (SMTC).

SUMMARY

The present disclosure provides a method and apparatus for measuring a neighbor cell.

In a first aspect, there is provided a method for measuring a neighbor cell, including: receiving SS/PBCH block measurement timing configuration (SMTC) information; and determining an SMTC window according to a positioning capability of a terminal device and the SMTC information, wherein the SMTC window is used to measure the neighbor cell.

In a second aspect, there is provided another method for measuring a neighbor cell, including: determining a positioning capability of at least one terminal device, wherein the at least one terminal device belongs to one cell; and sending SS/PBCH block measurement timing configuration (SMTC) information according to the positioning capability, wherein the SMTC information is used to determine a SMTC window required for measuring the neighbor cell.

In a third aspect, there is provided an apparatus for measuring a neighbor cell, the apparatus can implement functions corresponding to the method in the first aspect, and the functions may be implemented through hardware, and may also be implemented by executing corresponding software through the hardware. The hardware or software includes one or more units or modules corresponding to the above-mentioned functions.

In a fourth aspect, there is provided an apparatus for measuring a neighbor cell, the apparatus can implement functions corresponding to the method in the second aspect, and the functions may be implemented through hardware, and may also be implemented by executing corresponding software through the hardware. The hardware or software includes one or more units or modules corresponding to the above-mentioned functions.

In a fifth aspect, there is provided a computer-readable storage medium, wherein a computer program is stored in the computer-readable storage medium, and the computer program, when executed by a processor, causes the processor to execute the method described in the first aspect.

In a sixth aspect, there is provided a computer-readable storage medium, wherein a computer program is stored in the computer-readable storage medium, and the computer program, when executed by a processor, causes the processor to execute the method described in the second aspect.

In a seventh aspect, there is provided a computer program product, including computer program codes, which, when executed by a processor, cause the processor to perform the method described in the first aspect.

In an eighth aspect, there is provided a computer program product, including computer program codes, which, when executed by a processor, cause the processor to perform the method described in the second aspect.

In a ninth aspect, there is provided a computer program which, when run on a computer, causes the computer to perform the method described in the first aspect.

In a tenth aspect, there is provided a computer program which, when run on a computer, causes the computer to perform the method described in the second aspect.

DETAILED DESCRIPTION

The technical solutions will be described with reference to the accompany drawings of the embodiments of the present disclosure. It is apparent that the described embodiments are merely some instead of all embodiments of the present disclosure. Other embodiments obtained by those ordinarily skilled in the art based on the embodiments of the present disclosure without inventive work fall in the protection scope of the present disclosure.

Figure 1:
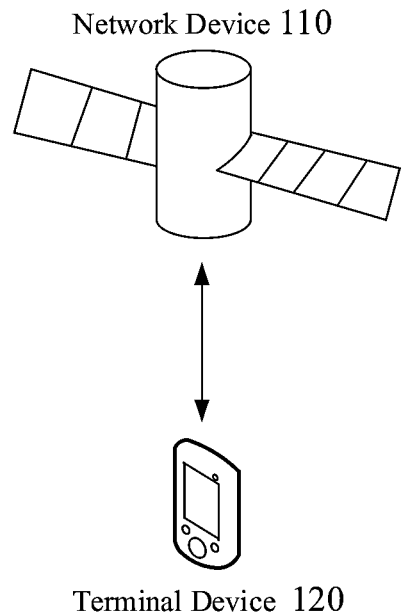
FIG. 1 is a schematic diagram of a communication system applicable to the present disclosure.

FIG. 1 is a schematic diagram of a communication system applicable to the present disclosure. The communication system 100 includes a network device 110 and a terminal device 120.

The network device 110 is a network device located in the air, which may be a high altitude platform station (HAPS) with a wireless communication function, and the HAPS may be a hot air balloon, an airplane, a satellite or other aircraft. Taking the network device 110 as the satellite as an example, the network device 110 may be a LEO satellite, a medium earth orbit (MEO) satellite, or a geostationary earth orbit (GEO) satellite, where operating periods of the LEO satellite and the MEG satellite are different from a rotation period of the earth and cannot remain relatively stationary with the earth. Therefore, the LEO satellite and the MEG satellite can also be called non-geostationary earth orbit (NGEO) satellites.

The terminal device 120 may be a mobile terminal device or a fixed terminal device. For example, the terminal device 120 may be a handheld device with a wireless communication function, a vehicle-mounted device, a wearable device, a computing device or other processing devices connected to wireless modems, such as a user equipment (UE) defined by the 3rd generation partnership project (3GPP), a mobile station (MS), a soft terminal, a home gateway, a set-top box, etc.

A bidirectional arrow line in FIG. 1 represents a signal between the network device 110 and the terminal device 120. When the network device 110 is the satellite, the satellite can transmit downlink data to the terminal device 120, and the downlink data can be transmitted to the terminal device 120 after channel coding, modulation and mapping. The terminal device 120 can also transmit uplink data to the satellite base station, and the uplink data can also be transmitted to the satellite after the channel coding, the modulation and mapping. The present disclosure does not limit a communication mode between the network device 110 and the terminal device 120.

A position where the network device 110 is located may be referred to as a space segment, and a position where the terminal device 120 is located may be referred to as a user segment. Optionally, the communication system 100 may further include a ground segment (not shown in FIG. 1), for example, a satellite measurement and control center, a network control center (NCC), various gateways and the like.

The satellite measurement and control center has functions of maintaining, monitoring and controlling an orbital position and attitude of the satellite, managing the ephemeris of the satellite and so on. The NCC has functions of handling user registration, identity verification, billing and other network management functions. In some satellite communication systems, the satellite measurement and control center and the NCC are integrated into one. The gateway has functions of call processing, switching, interfacing with the terrestrial communication network, and so on. The terrestrial communication network is an integral part of the ground segment and is used to send satellite data packets to the terminal device 120 through a core network, that is, the satellite can directly communicate with the terminal device 120 or indirectly communicate with the terminal device 120 through the ground segment. The terrestrial communication network can be a public switched telephone network (PSTN), a public land mobile network (PLMN) or other various private networks. Different terrestrial communication networks require the gateway to have different gateway functions.

In some satellite communication systems, the space segment of the satellite communication system may be a multi-layered structure consisting of a management satellite and one or more serving satellites. In the networking of the satellite communication system with the multi-layered structure, the space segment may include one or more management satellites and serving satellites managed by the managed satellites. The satellites mentioned in the present disclosure are not limited to the management satellite or the serving satellite.

A method for measuring a neighbor cell in an NTN provided by the present disclosure will be introduced in detail in the following.

Figure 2:
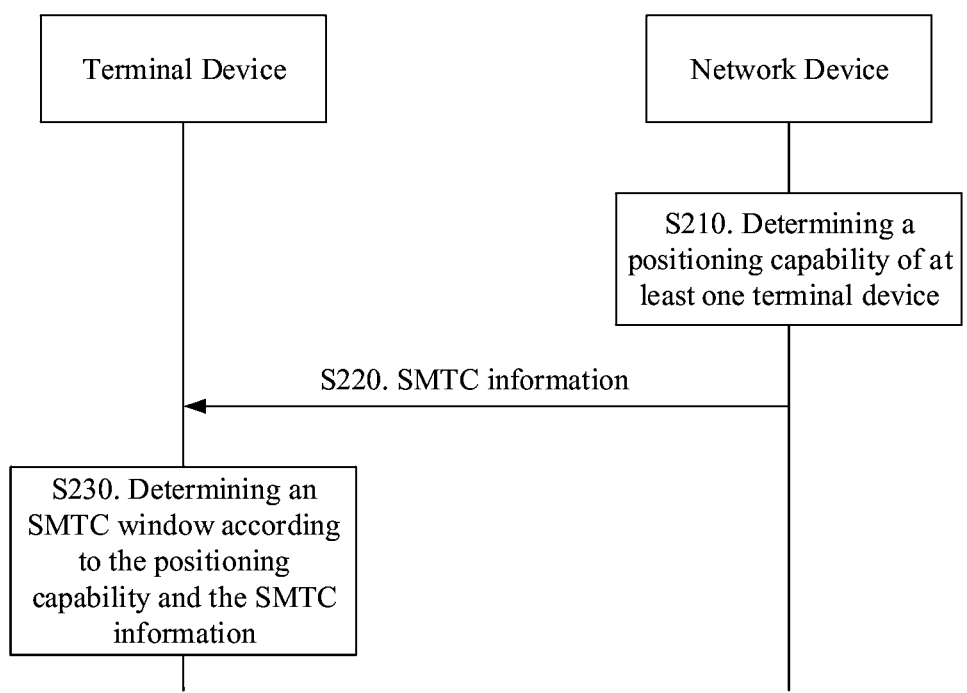
FIG. 2 is a schematic diagram of a method for measuring a neighbor cell provided by the present disclosure.

As shown in FIG. 2, the method 200 includes:

In S210, a network device determines a positioning capability of at least one terminal device.

The at least one terminal device belongs to one cell, which cell may be referred to as a current cell (also called a local cell) of the at least one terminal device. Cells other than the current cell may be referred to as neighbor cells. In the present disclosure, the current cell may be an NTN cell or a non-NTN cell, and the neighbor cell refers to the NTN cell. The network devices may be a non-terrestrial network device such as the satellite, or may be a terrestrial network device.

The positioning capability of the terminal device can be understood as a capability of the terminal device to determine its own position.

For example, the terminal device can determine its position through the BeiDou navigation satellite system or the global positioning system (GPS), or can determine its position through a base station, a wireless fidelity (Wi-Fi) signal, or a Bluetooth signal, or can determine its position by matching a live street view with a street view map. The present disclosure does not limit the positioning capability of the terminal device.

In the foregoing several examples of the positioning capability of the terminal device, different examples show different positioning capabilities. For example, under normal circumstances, when the terminal device can normally receive a satellite signal and a base station signal, a satellite-based positioning capability is higher than a base station-based positioning capability.

When the positioning capability of the terminal device is high, the terminal device can more accurately calculate a delay of a signal of the neighbor cell reaching the terminal device, and the terminal device can accurately determine a time domain position and a duration of the SMTC window (that is, a time window for measuring the neighbor cell); and when the positioning capability of the terminal device is low, the terminal device cannot accurately calculate the delay of the signal of the neighbor cell reaching the terminal device, and accordingly, the terminal device cannot accurately determine the time domain position and the duration of the SMTC window.

Based on the above factors, the network device needs to determine the positioning capability of the terminal device, so as to send different SMTC information based on different situations.

The terminal device can report its positioning capability during a capability reporting process.

For example, the terminal device can report whether it supports satellite positioning; when the terminal device supports the satellite positioning, the terminal device can also report a strength of a current satellite signal, so that the network device can determine the current positioning capability of the terminal device. Optionally, the terminal device may also directly report the current positioning accuracy.

After determining the positioning capability of the terminal device, the network device can determine whether the positioning capability of the terminal device meets a requirement according to a preset condition. The preset condition may be a positioning manner of the terminal device or the positioning accuracy of the terminal device.

For example, when the preset condition is that the terminal device needs to be positioned based on the satellite positioning system, if the positioning manner of the terminal device is based on the base station for positioning, the positioning capability of the terminal device does not meet the requirement; if the positioning manner of the terminal device is based on the BeiDou navigation satellite system for positioning, the positioning capability of the terminal device meets the requirement.

For another example, when the preset condition is that the positioning accuracy of the terminal device needs to be within 10 meters of error, if the positioning accuracy of the terminal device is greater than 10 meters, the positioning capability of the terminal device does not meet the requirement; and if the positioning accuracy of the terminal device is 5 meters, the positioning capability of the terminal device meets the requirement.

The present disclosure does not limit a manner in which the network device determines whether the capability of the terminal device meets the requirement.

According to whether the positioning capability of the at least one terminal device belonging to one cell meets the requirement, the network device has the following processing situations.

In situation 1, none of the at least one terminal device has the positioning capability that meets the requirement.

The network device may send the SMTC information including first start time offset information and first duration information. The first start time offset information is used to indicate an offset of a start time domain position of the SMTC window relative to a start time domain position of a SMTC period where the SMTC window is located, and the start time domain position of the SMTC period is determined based on a transmission time of the SSB. The first duration information is used to indicate a duration of the SMTC window.

In situation 1-1, the network device configures the SMTC window for a frequency point, and the first start time offset information may be determined based on the minimum difference between signal delays of all neighbor cells of a frequency point to be measured and a signal delay of the current cell.

For example, a delay of the signal of the current cell corresponding to the frequency point to be measured reaching the terminal device is 4 ms, the frequency point to be measured corresponds to three neighbor cells, and differences between delays of signals of these three neighbor cells reaching the terminal device and the delay of the signal of the current cell reaching the terminal device are respectively 6 ms, 11 ms and 16 ms, the offset indicated by the first start time offset information can be 6 ms, or can be other values less than 6 ms, such as 5 ms, to avoid the missing detection of the SSB of the neighbor cell by the terminal device due to the factors such as the calculation error.

In a case where the network device configures the SMTC window for the frequency point, the first duration information may be determined based on an interval between the minimum delay and the maximum delay of signals of all neighbor cells corresponding to the frequency point to be measured.

For example, the frequency point to be measured corresponds to three neighbor cells, and the delays of the signals of these three neighbor cells reaching the terminal device are respectively 10 ms, 15 ms, and 20 ms, and the minimum delay is 10 ms, the maximum delay is 20 ms. The duration indicated by the first duration information may be a difference between the maximum delay and the minimum delay, that is, 10 ms. Optionally, the duration indicated by the first duration information may also be greater than 10 ms, so as to avoid the missing detection of the SSB of the neighbor cell by the terminal device due to the factors such as the calculation error.

In situation 1-2, the network device configures the SMTC window for the neighbor cell, and the first start time offset information may be determined based on a delay of a signal of a neighbor cell to be measured.

For example, the delay of the signal of the current cell reaching the terminal device is 4 ms, there are three neighbor cells to be measured near the current cell, and a difference between a delay of a signal of one of the neighbor cells reaching the terminal device and the delay of the signal of the current cell reaching the terminal device is 6 ms, the offset indicated by the first start time offset information can be 6 ms, or it can be other values less than 6 ms, such as 5 ms, so as to avoid the missing detection of the SSB of the neighbor cell by the terminal device due to the factors such as the calculation error.

In a case where the network device configures the SMTC window for the neighbor cell, the first duration information may be determined based on an interval between the minimum delay and the maximum delay of signals of the neighbor cell to be measured.

For example, the minimum delay and the maximum delay of the signals of the neighbor cell reaching the terminal device are respectively 10 ms and 15 ms, then the duration indicated by the first duration information may be a difference between the maximum delay and the minimum delay, that is, 5 ms. Optionally, the duration indicated by the first duration information may also be greater than 5 ms, so as to avoid the missing detection of the SSB of the neighbor cell by the terminal device due to the factors such as the calculation error.

The satellites of a plurality of neighbor cells corresponding to one frequency point usually include satellites that are far away, and a difference between signal delays of the plurality of neighbor cells is usually greater than the difference between the minimum delay and the maximum delay of the signals of one neighbor cell. Therefore, configuring the SMTC window based on the neighbor cell is beneficial to shorten the duration for the terminal device to measure the neighbor cell, thereby reducing the power consumption of the terminal device.

In situation 1-3, the network device configures the SMTC window for a neighbor cell group, and the first start time offset information may be determined based on the minimum delay of signals of a neighbor cell group to be measured.

For another example, the delay of the signal of the current cell reaching the terminal device is 4 ms, there are four neighbor cells to be measured near the current cell, which are respectively neighbor cell 1, neighbor cell 2, neighbor cell 3, and neighbor cell 4, and differences between delays of signals of these four neighbor cell reaching the terminal device and the delay of the signal of the current cell reaching the terminal device are respectively 6 ms (neighbor cell 1), 8 ms (neighbor cell 2), 17 ms (neighbor cell 3) and 21 ms (neighbor cell 4), and then the network device may group neighbor cells with similar delays into one group, that is, group neighbor cells 1 and 2 into one group, and group neighbor cells 3 and 4 into one group. Taking the neighbor cell group corresponding to the first start time offset information as a neighbor cell group including the neighbor cell 1 and the neighbor cell 2 as an example, the offset indicated by the first start time offset information may be 6 ms or other values less than 6 ms, such as 5 ms, so as to avoid the missing detection of the SSB of the neighbor cell by the terminal device due to the factors such as the calculation error.

In a case where the network device configures the SMTC window for the neighbor cell group, the first duration information may be determined based on the interval between the minimum delay and the maximum delay of the signals of the neighbor cell group to be measured.

For example, there are four neighbor cells to be measured near the current cell, which are respectively neighbor cell 1, neighbor cell 2, neighbor cell 3, and neighbor cell 4, and a delay of a signal of the neighbor cell 1 reaching the terminal device is 10 ms, a delay of a signal of the neighbor cell 2 reaching the terminal device is 12 ms, a delay of a signal of the neighbor cell 3 reaching the terminal device is 21 ms, and a delay of a signal of the neighbor cell 4 reaching the terminal device is 25 ms, and then the network device may group neighbor cells with similar delays into one group, that is, group neighbor cells 1 and 2 into one group, and group neighbor cells 3 and 4 into one group. Taking the neighbor cell group corresponding to the first duration information as a neighbor cell group including the neighbor cell 1 and the neighbor cell 2 as an example, the duration of the SMTC window indicated by the first duration information may be 2 ms, that is, a difference between the minimum delay 10 ms and the maximum delay 12 ms. Optionally, the duration indicated by the first duration information may also be greater than 2 ms, so as to avoid the missing detection of the SSB of the neighbor cell by the terminal device due to the factors such as the calculation error.

The satellites of a plurality of neighbor cells corresponding to one frequency point usually include satellites that are far away, and a difference between signal delays of the plurality of neighbor cells is usually greater than the difference between the minimum delay and the maximum delay of the signals of one neighbor cell group. Therefore, configuring the SMTC window based on the neighbor cell group is beneficial to shorten the duration for the terminal device to measure the neighbor cell, thereby reducing the power consumption of the terminal device.

In situation 2, each of the at least one terminal device has the positioning capability that meets the requirement.

The network device may send the SMTC information including second start time offset information and second duration information. The second start time offset information is used to indicate an offset of a start time domain position of the SMTC window relative to a start time domain position of a SMTC period where the SMTC window is located. The second duration information is used to indicate a duration of the SMTC window.

The network device may determine the second start time offset information according to the delay of the signal of the current cell reaching the terminal device. For example, if the delay of the signal of the current cell reaching the terminal device is 2 ms, the offset indicated by the second start time offset information may be 2 ms or a value less than 2 ms.

A duration indicated by the second duration information may be a time determined by the network device based on preset information (e.g., a communication standard).

The terminal device can determine a difference between the signal delay of the neighbor cell and the signal delay of the current cell based on its positioning capability, and adjust the SMTC window indicated by the second start time offset information and the second duration information based on the difference.

In situation 3, the at least one terminal device includes a terminal device whose positioning capability does not meet the requirement and a terminal device whose positioning capability meets the requirement.

The network device may send the SMTC information including the following information: the first start time offset information, the second start time offset information, the first duration information and the second duration information. The duration indicated by the first duration information is longer than the duration indicated by the second duration information.

The terminal device whose positioning capability does not meet the requirement has low positioning accuracy, and the signal delay accuracy of the neighbor cell calculated by the network device based on the position of the terminal device is also low, a longer SMTC window needs to be configured to reduce the risk of the missing detection of SSB; and the terminal device whose positioning capability meets the requirement has high positioning accuracy, and the signal delay accuracy of the neighbor cell calculated by the terminal device based on its position is also high, a shorter SMTC window is configured to meet the needs of detecting the SSB. Therefore, the network device can configure the SMTC windows with different lengths for different terminal devices to meet the requirement of different terminal devices.

The above-mentioned several situations are all in milliseconds as a time unit, and the present disclosure does not limit units of a time length, a time offset and a period of the SMTC window. For example, the units of the time length o and the time offset of the SMTC window can be a time domain symbol, and the unit of the period corresponding to the SMTC window can be a time slot.

After determining the SMTC information according to the positioning capability of the at least one terminal device, the network device may send the SMTC information through a system message, which system message is, for example, a system information block (SIB) x, where x is an integer greater than or equal to 1.

The system message may also include at least one frequency point required by the terminal device to measure the neighbor cell, and a neighbor cell list corresponding to each of the at least one frequency point. The SMTC information may also contain information indicating the SMTC period.

The terminal device can perform the following steps.

In S220, the terminal device receives the SMTC information.

In S230, terminal device determines the SMTC window according to the positioning capability and the SMTC information.

For the terminal device whose positioning capability does not meet the requirement, it may receive the SSB of the neighbor cell according to the SMTC window indicated by the first start time offset information and the first duration information in the SMTC information.

Figure 3:
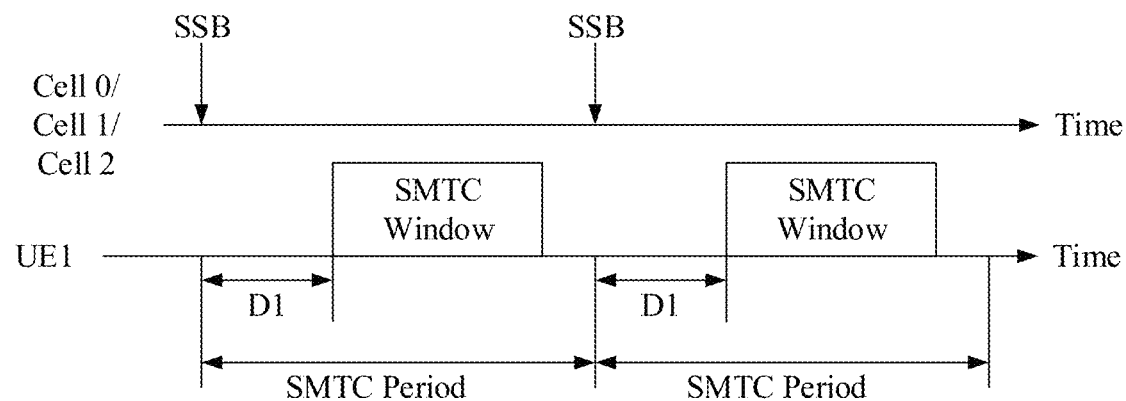
FIG. 3 is a schematic diagram of another method for measuring a neighbor cell provided by the present disclosure.

FIG. 3 shows a method for measuring a neighbor cell by a terminal device whose positioning capability does not meet a requirement.

In this case, there is one terminal device and three NTN cells, the terminal device is UE1, and the three NTN cells are cell 0, cell 1, and cell 2, respectively. These three cells send the SSB at the same time, and UE1 resides on cell 0. Cell 0 sends the SMTC information associated with frequency point 1 or cell 1 or cell group 1, and UE1 performs the neighbor cell measurement after receiving the SMTC information.

If the SMTC information is associated with frequency point 1, UE1 measures all neighbor cells corresponding to frequency point 1 according to the SMTC information. In this example, all neighbor cells corresponding to frequency point 1 are cell 1 and cell 2. The SMTC information includes the first start time offset information, and the indicated offset is D1; the SMTC information also includes the first duration information, and the indicated duration L1 is a difference between the signal delay of cell 1 and the signal delay of cell 2. UE1 receives the SSBs of cell 1 and cell 2 within the corresponding SMTC window according to D1 and L1 configured by the network device.

If the SMTC information is associated with cell 1, UE1 measures cell 1 according to the SMTC information. The SMTC information includes the first start time offset information, and the indicated offset is D1; the SMTC information also includes the first duration information, and the indicated duration is L1 (this duration is a duration determined by the network device, which is not related to the difference between the signal delay of cell 1 and the signal delay of cell 2). UE1 receives the SSB of cell 1 within the corresponding SMTC window according to D1 and L1 configured by the network device. Optionally, the network device may also send the SMTC information associated with cell 2, so that UE1 can measure cell 2.

If the SMTC information is associated with cell group 1, the UE1 measures cell group 1 according to the SMTC information. In this example, all neighbor cells included in cell group 1 are cell 1 and cell 2. The SMTC information includes the first start time offset information, and the indicated offset is D1; the SMTC information also includes the first duration information, and the indicated duration L1 is the difference between the signal delay of cell 1 and the signal delay of cell 2. UE1 receives the SSBs of cell 1 and cell 2 within the corresponding SMTC window according to D1 and L1 configured by the network device.

For the terminal device whose positioning capability meets the requirement, it can determine the SMTC window after adjusting the offset indicated by the second start time offset information in the SMTC information, and receive the SSB of the neighbor cell within the SMTC window.

Figure 4:
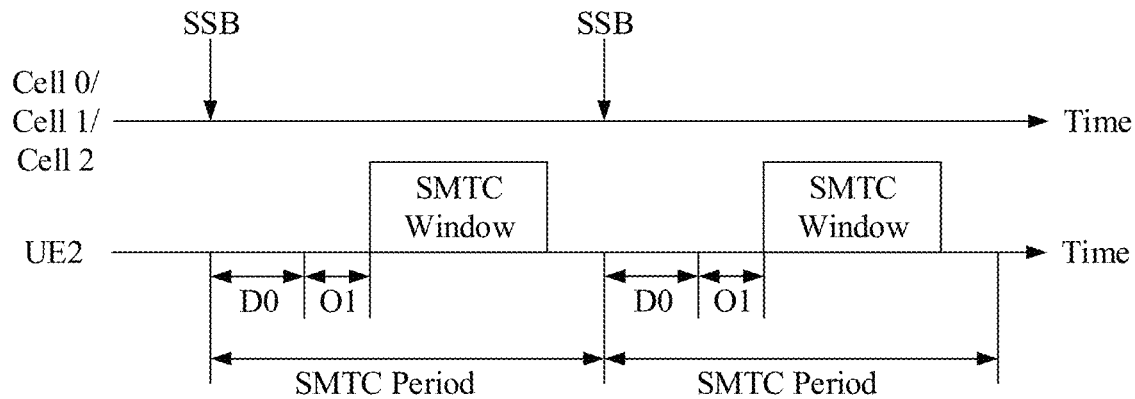
FIG. 4 is a schematic diagram of yet another method for measuring a neighbor cell provided by the present disclosure.

FIG. 4 is a method for measuring a neighbor cell by a terminal device whose positioning capability meets a requirement.

In this case, there is one terminal device and three NTN cells, the terminal device is UE2, and the three NTN cells are cell 0, cell 1 and cell 2, these three cells send the SSB at the same time, and UE2 resides on cell 0. Cell 0 sends the SMTC information associated with frequency point 1 or cell 1 or cell group 1, and UE2 performs the neighbor cell measurement after receiving the SMTC information.

If the SMTC information is associated with frequency point 1, UE2 measures all neighbor cells corresponding to frequency point 1 according to the SMTC information. In this example, all neighbor cells corresponding to frequency point 1 are cell 1 and cell 2. The SMTC information includes the second start time offset information, and the indicated offset is D0; the SMTC information may also include the second duration information, and the indicated duration is L1.

UE2 determines that the difference between the signal delay of cell 1 and the signal delay of cell 0 is O1 based on its positioning capability, and UE2 determines that the difference between the signal delay of cell 2 and the signal delay of cell 0 is O2 based on its positioning capability, where O1 is less than O2, then UE2 can adjust D0 according to O1, that is, adjust the offset of the start time of the SMTC window to D0+O1. The UE2 may also determine that the duration L2 of the SMTC window is the difference between the signal delay of cell 1 and the signal delay of cell 2. Subsequently, UE2 receives the SSBs sent by cell 1 and cell 2 within the corresponding SMTC window based on D0+O1 and L2 determined by itself.

If the SMTC information is associated with cell 1, UE2 measures cell 1 according to the SMTC information. The SMTC information includes the second start time offset information, and the indicated offset is D0; and the SMTC information may also include the second duration information, and the indicated duration is L1.

UE2 determines that the difference between the signal delay of cell 0 and the signal delay of cell 1 is O1 based on its positioning capability, and then UE2 can adjust D0 according to O1, that is, adjust the offset of the start time of the SMTC window to D0+O1. Subsequently, the UE2 receives the SSB sent by the cell 1 within the corresponding SMTC window based on D0+O1 determined by itself and L1 configured by the network device.

If the SMTC information is associated with cell group 1, the UE2 measures all neighbor cells included in cell group 1 according to the SMTC information. In this example, all neighbor cells included in cell group 1 are cell 1 and cell 2. The SMTC information includes the second start time offset information, and the indicated offset is D0; the SMTC information may also include the second duration information, and the indicated duration is L1.

UE2 determines that the difference between the signal delay of cell 1 and the signal delay of cell 0 is O1 based on its positioning capability, and UE2 determines that the difference between the signal delay of cell 2 and the signal delay of cell 0 based on its positioning capability is O2, where O1 is less than O2, then UE2 can adjust D0 according to O1, that is, adjust the offset of the start time of the SMTC window to D0+O1. The UE2 may also determine that the duration L2 of the SMTC window is the difference between the signal delay of cell 1 and the signal delay of cell 2. Subsequently, UE2 receives the SSBs sent by cell 1 and cell 2 within the corresponding SMTC window based on D0+O1 and L2 determined by itself.

In the examples described in FIG. 3 and FIG. 4, there is only one type of terminal device in the current cell. Therefore, the network device may send the SMTC information including the first start time offset information and the first duration information, or the network device may send the SMTC information including the second start time offset information and the second duration information.

Figure 5:
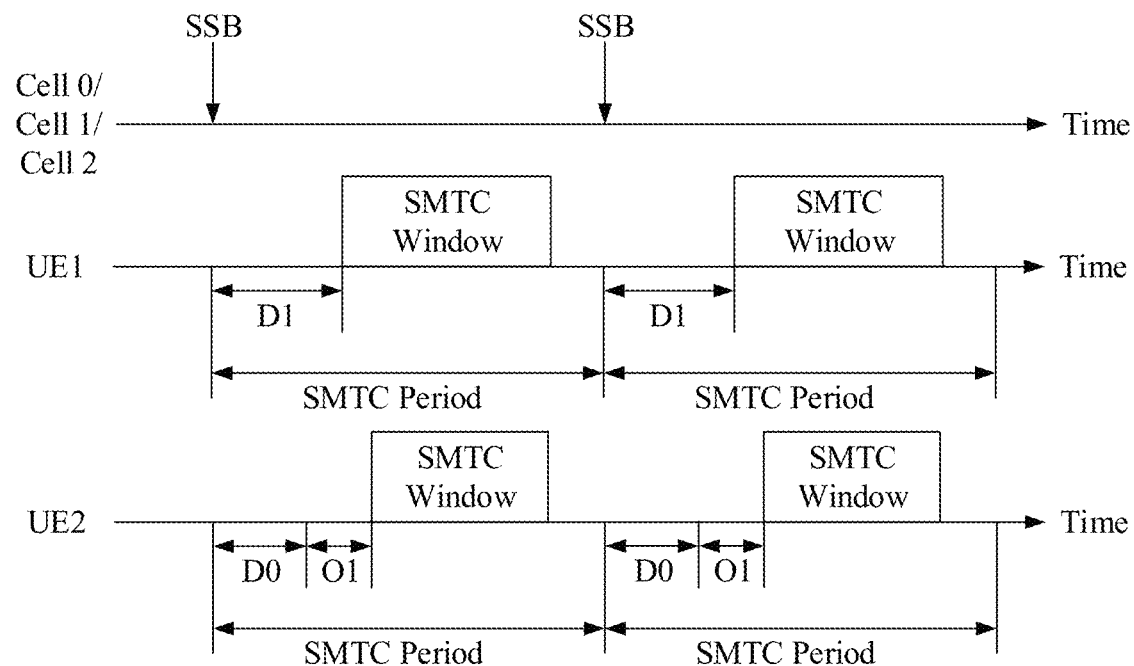
FIG. 5 is a schematic diagram of yet another method for measuring a neighbor cell provided by the present disclosure.

The following describes a scenario in which the terminal device whose positioning capability meets the requirement and the terminal device whose positioning capability does not meet the requirement coexist with reference to FIG. 5.

As shown in FIG. 5, there are two terminal devices and three NTN cells in this case. The two terminal devices are UE1 and UE2, and the three NTN cells are cell 0, cell 1 and cell 2, respectively. These three cells send the SSB at the same time, and both UE1 and UE2 reside on cell 0. Cell 0 sends the SMTC information associated with frequency point 1 or cell 1 or cell group 1, and UE1 and UE2 perform the neighbor cell measurement after receiving the SMTC information.

The network device can send the SMTC information including two kinds of start time offset information and two kinds of duration information. For example, the SMTC information may include the first start time offset information, the first duration information, the second start time offset information, and the second duration information, and the duration indicated by the first duration information is greater than the duration indicated by the second duration information.

UE1 whose positioning capability does not meet the requirement may determine the SMTC window based on the first start time offset information and the first duration information; and UE2 whose positioning capability meets the requirement may determine the SMTC window based on the second start time offset information and the second duration information. A specific manner of UE1 determining the SMTC window may refer to the example corresponding to FIG. 3, and a specific manner of UE2 determining the SMTC window may refer to the example corresponding to FIG. 4.

The example of the method for measuring the neighbor cell provided by the present disclosure is described in detail above. It may be understood that in order to achieve the above functions, an apparatus for measuring a neighbor cell includes corresponding hardware structures and/or software modules for performing each function. Those skilled in the art may easily understand that in connection with the units and algorithm actions of the examples described in the implementations disclosed herein, the present disclosure may be implemented in a form of hardware or a combination of the hardware and computer software. Whether a function is performed in a form of hardware or computer software driving hardware depends on a particular application and a design constraint condition of the technical solution. A skilled person may use various methods to implement the described functions for each particular application, but such implementation should not be considered to be beyond the scope of the present disclosure.

Division for functional units may be performed on the apparatus for measuring the neighbor cell according to the above method examples in the present disclosure. For example, various functions may be divided into various functional units, or two or more functions may be integrated into one processing unit. The above integrated unit may be implemented in a form of hardware, or may be implemented in a form of software function unit. It should be noted that, the division of the units in the present disclosure is illustrative, and is merely the division of logical functions. Other division modes may be used in actual implementations.

Figure 6:
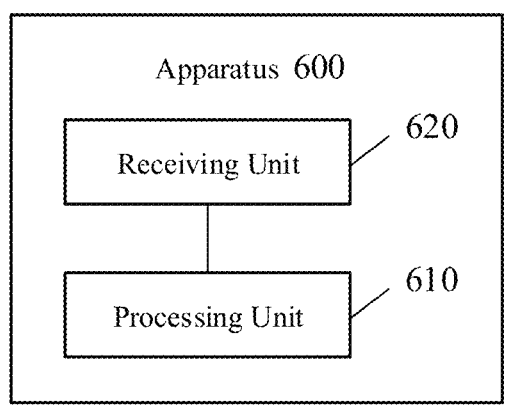
FIG. 6 is a schematic diagram of an apparatus for measuring a neighbor cell provided by the present disclosure.

FIG. 6 is a schematic structural diagram of an apparatus for measuring a neighbor cell provided by the present disclosure. The apparatus 600 includes a processing unit 610 and a receiving unit 620, and the receiving unit 620 can perform a receiving step under the control of the processing unit 610.

The receiving unit 620 is configured to receive SMTC information; and
  the processing unit 610 is configured to determine an SMTC window according to a positioning capability of a terminal device and the SMTC information, and the SMTC window is used to measure the neighbor cell.

Optionally, when the positioning capability fails to meet a requirement, a start time of the SMTC window is a time indicated by first start time offset information in the SMTC information.

Optionally, when the positioning capability fails to meet a requirement, a duration of the SMTC window is a duration indicated by first duration information in the SMTC information.

Optionally, the SMTC information further includes second duration information, the duration indicated by the first duration information is longer than a duration indicated by the second duration information, and the second duration information is used to indicate a duration of the SMTC window when the positioning capability meets the requirement.

Optionally, the SMTC information is used to configure a SMTC window of a frequency point, or a SMTC window of the neighbor cell, or a SMTC window of a neighbor cell group.

Optionally, when the positioning capability meets a requirement, a start time of the SMTC window is a time obtained by adjusting a time indicated by second start time offset information in the SMTC information, and a time interval between the adjusted time and the time indicated by the second start time offset information is less than or equal to: an interval between a minimum delay of signals of all neighbor cells corresponding to a frequency point corresponding to the SMTC information and a signal delay of an current cell; or, an interval between a signal delay of a neighbor cell corresponding to the SMTC information and the signal delay of the current cell; or, an interval between a minimum delay of signals of a neighbor cell group corresponding to the SMTC information and the signal delay of the current cell.

Optionally, when the positioning capability meets a requirement, a duration of the SMTC window is greater than or equal to: an interval between a maximum delay and a minimum delay of signals of all neighbor cells corresponding to a frequency point corresponding to the SMTC information; or, a duration indicated by second duration information in the SMTC information; or, an interval between a minimum delay and a maximum delay of signals of a neighbor cell group corresponding to the SMTC information.

For the specific manner in which the apparatus 600 performs the method for measuring the neighbor cell and the beneficial effects produced, reference may be made to the relevant descriptions in the method embodiments.

Figure 7:
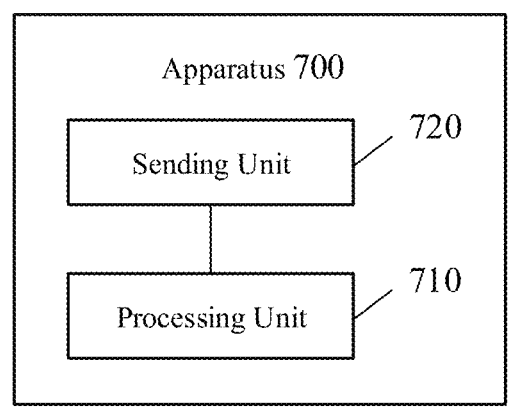
FIG. 7 is a schematic diagram of another apparatus for measuring a neighbor cell provided by the present disclosure.

FIG. 7 is a schematic structural diagram of an apparatus for measuring a neighbor cell provided by the present disclosure. The apparatus 700 includes a processing unit 710 and a sending unit 720, and the sending unit 720 can perform a sending step under the control of the processing unit 710.

The processing unit 710 is configured to determine a positioning capability of at least one terminal device, and the at least one terminal device belongs to one cell; and
  the sending unit 720 is configured to send SMTC information according to the positioning capability, and the SMTC information is used to determine a SMTC window required for measuring the neighbor cell.

Optionally, when the at least one terminal device includes a terminal device whose positioning capability fails to meet a requirement, the SMTC information includes first start time offset information, and the first start time offset information is determined based on one of the following conditions: a minimum delay of signals of all neighbor cells corresponding to a frequency point to be measured; a signal delay of a neighbor cell to be measured; and a minimum delay of signals of a neighbor cell group to be measured.

Optionally, when the at least one terminal device includes a terminal device whose positioning capability fails to meet a requirement, the SMTC information includes first duration information, and the first duration information is determined based on one of the following conditions: an interval between a minimum delay and a maximum delay of signals of all neighbor cells corresponding to a frequency point to be measured; an interval between a minimum delay and a maximum delay of signals of a neighbor cell to be measured; and an interval between a minimum delay and a maximum delay of signals of a neighbor cell group to be measured.

Optionally, when the at least one terminal device includes a terminal device whose positioning capability meets the requirement, the SMTC information includes second duration information, and a duration indicated by the first duration information is longer than a duration indicated by the second duration information, and the second duration information is used to indicate a duration of the SMTC window when the positioning capability meets the requirement.

Optionally, when the at least one terminal device includes a terminal device whose positioning capability meets a requirement, the SMTC information includes second start time offset information, and the second start time offset information is determined based on the following conditions: a signal delay of the cell to which the at least one terminal device belongs.

For the specific manner in which the apparatus 700 performs the method for measuring the neighbor cell and the beneficial effects produced, reference may be made to the relevant descriptions in the method embodiments.

Figure 8:
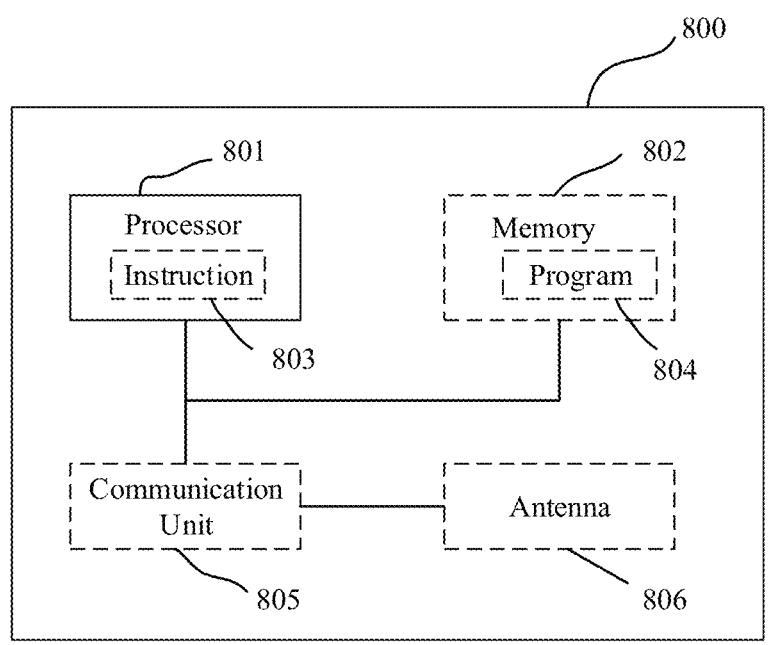
FIG. 8 is a schematic diagram of a communication device for measuring a neighbor cell provided by the present disclosure.

FIG. 8 shows a schematic structural diagram of a communication device provided by the present disclosure. The dashed line in FIG. 8 indicates that the unit or the module is optional. A device 800 may be configured to implement the method described in the above method implementations. The device 800 may be a terminal device or a network device or a chip.

The device 800 includes one or more processors 801, the one or more processors 801 may support the device 800 to implement the methods in the method implementations corresponding to FIGS. 2 to 5. The processor 801 may be a general purpose processor or a special purpose processor. For example, the processor 801 may be a central processing unit (CPU). The CPU may be configured to control the device 800, execute software programs, and process data of the software programs. The device 800 may further include a communication unit 805 configured to implement input (reception) and output (transmission) of signals.

For example, the device 800 may be a chip, and the communication unit 805 may be an input and/or output circuit of the chip, or the communication unit 805 may be a communication interface of the chip, which may be a component of a terminal device or a network device or other wireless communication devices.

For another example, the device 800 may be a terminal device or a network device, and the communication unit 805 may be a transceiver of the terminal device or the network device, or the communication unit 805 may be a transceiving circuit of the terminal device or the network device.

The device 800 may include one or more memories 802 on which a program 804 is stored, and the program 804 may be executed by the processor 801 to generate an instruction 803, enabling the processor 801 to perform the methods described in the above method implementations according to the instruction 803. Optionally, data may also be stored in the memory 802. Optionally, the processor 801 may also read data stored in the memory 802, and the data may be stored at a same storage address as the program 804, or at a different storage address from the program 804.

The processor 801 and the memory 802 may be arranged separately or integrated together, for example, they may be integrated on a system on chip (SOC) of a terminal device.

The device 800 may also include an antenna 806. The communication unit 805 is configured to implement the transceiving function of the device 800 by the antenna 806.

For the specific manners in which the processor 801 performs the method for measuring the neighbor cell, reference can be made to the related description in the method implementations.

It should be understood that each step of the foregoing method implementations may be implemented by an integrated logic circuit in a form of hardware in the processor 801 or instructions in a form of software. The processor 801 may be a CPU, a digital signal processor (DSP), an application specific integrated circuit (ASIC), a field programmable gate array (FPGA), or another programmable logic device, such as a discrete gate, a transistor logic device, or a discrete hardware component.

The present disclosure further provides a computer program product which, when being executed by the processor 801, carries out the method described in any of the method implementations in the present disclosure.

The computer program product may be stored in the memory 802, for example, the computer program may be a program 804, which is finally converted into an executable object file that can be executed by the processor 801 after being subjected to processing procedures such as preprocessing, compiling, assembling and linking.

The present disclosure further provides a computer readable storage medium having stored therein a computer program which, when being executed by a computer, carries out the method described in any method implementation in the present disclosure. The computer program may be a high-level language program or an executable object program.

The computer readable storage medium is, for example, the memory 802. The memory 802 may be a volatile memory or non-volatile memory, or the memory 802 may include both the volatile memory and the non-volatile memory. The non-volatile memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. By way of example rather than limitation, a RAM is available in many forms such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM).

Those skilled in the art can clearly understand that for the convenience and conciseness of description, for the specific operation processes and technical effects of the above-described devices and apparatus, reference can be made to the corresponding processes and technical effects in the above-mentioned method implementations, which will not be described in detail here.

According to the embodiments provided by the present disclosure, it should be understood that the disclosed systems, apparatuses and methods may be implemented in other ways. For example, some features of the method implementations described above may be ignored or not performed. The apparatus implementations described above are only illustrative, and the division of the units is only a logical function division, and there may be other division manners in actual implementations. For example, multiple units or components may be combined or integrated into another system. In addition, the coupling between units or components can be direct coupling or indirect coupling, which includes electrical, mechanical or other forms of connection.

It should be understood that in various implementations of the present disclosure, the serial numbers of the foregoing processes do not mean a performing order. The performing order of the processes should be determined according to functions and internal logics of the processes, and should not impose any limitation on implementation processes of the embodiments of the present disclosure.

In addition, the terms "system" and "network" are often used interchangeably herein. The term "and/or" used here is merely an association relation describing associated objects, indicating that there may be three relations, for example, A and/or B may indicate three cases where A exists alone, A and B exist concurrently, and B exists alone. In addition, the character "/" used herein generally indicates that the related objects before and after this character are in an "or" relationship.

In general, those described above are only preferred implementations of the present disclosure, which are not intended to limit the protection scope of the present disclosure. Any modification, equivalent substitution, improvement, etc. made within the spirit and principle of the present disclosure shall be included in the protection scope of the present disclosure.

What is claimed is:

1. A neighboring cell measurement method, comprising:
   receiving SS/PBCH block measurement timing configuration (SMTC) information; and
   determining an SMTC window according to a positioning capability of a terminal device and the SMTC information, wherein the SMTC window is used for neighboring cell measurement,
   wherein when the positioning capability meets a requirement, a start time of the SMTC window is a time obtained by adjusting a time indicated by second start time offset information in the SMTC information, and a time interval between the adjusted time and the time indicated by the second start time offset information is less than or equal to:
      an interval between a minimum delay of signals of all neighbor cells corresponding to a frequency point corresponding to the SMTC information and a signal delay of current cell; or,
      an interval between a signal delay of a neighbor cell corresponding to the SMTC information and the signal delay of the current cell; or,
      an interval between a minimum delay of signals of a neighbor cell group corresponding to the SMTC information and the signal delay of the current cell.

2. The method according to claim 1, wherein when the positioning capability fails to meet the requirement, a start time of the SMTC window is a time indicated by first start time offset information in the SMTC information.

3. The method according to claim 1, wherein when the positioning capability fails to meet the requirement, a duration of the SMTC window is a duration indicated by first duration information in the SMTC information.

4. The method according to claim 3, wherein the SMTC information further comprises second duration information, the duration indicated by the first duration information is longer than a duration indicated by the second duration information, and the second duration information is used to indicate a duration of the SMTC window when the positioning capability meets the requirement.

5. The method according to claim 2, wherein the SMTC information is used to configure the following types of SMTC windows:
   a SMTC window corresponding to a frequency point, or
   a SMTC window corresponding to a neighbor cell, or
   a SMTC window of a neighbor cell group.

6. The method according to claim 1, wherein when the positioning capability meets the requirement, a duration of the SMTC window is greater than or equal to:
   an interval between a maximum delay and a minimum delay of signals of all neighbor cells corresponding to a frequency point corresponding to the SMTC information; or,
   a duration indicated by second duration information in the SMTC information; or,
   an interval between a minimum delay and a maximum delay of signals of a neighbor cell group corresponding to the SMTC information.

7. The method according to claim 1, wherein the neighboring cell is a non-terrestrial communication network cell.

8. A neighboring cell measurement method, comprising:
   determining a positioning capability of at least one terminal device, wherein the at least one terminal device belongs to one cell; and
   sending SS/PBCH block measurement timing configuration (SMTC) information according to the positioning capability, wherein the SMTC information is used to determine a SMTC window required for the neighboring cell measurement,
   wherein when the at least one terminal device comprises a terminal device whose positioning capability meets a requirement, the SMTC information comprises second start time offset information, and the second start time offset information is determined based on the following conditions:
      a signal delay of the cell to which the at least one terminal device belongs.

9. The method according to claim 8, wherein when the at least one terminal device comprises a terminal device whose positioning capability fails to meet the requirement, the SMTC information comprises first start time offset information, and the first start time offset information is determined based on one of the following conditions:
   a minimum delay of signals of all neighbor cells corresponding to a frequency point to be measured;
   a signal delay of a neighbor cell to be measured; and
   a minimum delay of signals of a neighbor cell group to be measured.

10. The method according to claim 8, wherein when the at least one terminal device comprises a terminal device whose positioning capability fails to meet the requirement, the SMTC information comprises first duration information, and the first duration Information is determined based on one of the following conditions:
    an interval between a minimum delay and a maximum delay of signals of all neighbor cells corresponding to a frequency point to be measured;
    an interval between a minimum delay and a maximum delay of signals of a neighbor cell to be measured; and
    an interval between a minimum delay and a maximum delay of signals of a neighbor cell group to be measured.

11. The method according to claim 10, wherein when the at least one terminal device comprises a terminal device whose positioning capability meets the requirement, the SMTC information comprises second duration information, and a duration indicated by the first duration information is longer than a duration indicated by the second duration information, and the second duration information is used to indicate a duration of the SMTC window when the positioning capability meets the requirement.

12. The method according to claim 8, wherein the neighboring cell is a non-terrestrial communication network cell.

13. A network device, comprising: a processor and a memory, wherein the memory is configured to store a computer program, and the processor is configured to call and run the computer program stored in the memory, and execute the method according to claim 8.

14. A terminal device, comprising:
a processor and a memory, wherein the memory is configured to store a computer program, and the processor is configured to call and run the computer program stored in the memory, and execute a neighboring cell measurement method comprising:
  receiving SS/PBCH block measurement timing configuration (SMTC) information; and
  determining an SMTC window according to a positioning capability of a terminal device and the SMTC information, wherein the SMTC window is used for neighboring cell measurement,
wherein when the positioning capability meets a requirement, a start time of the SMTC window is a time obtained by adjusting a time indicated by second start time offset information in the SMTC information, and a time interval between the adjusted time and the time indicated by the second start time offset information is less than or equal to:
  an interval between a minimum delay of signals of all neighbor cells corresponding to a frequency point corresponding to the SMTC information and a signal delay of current cell; or,
  an interval between a signal delay of a neighbor cell corresponding to the SMTC information and the signal delay of the current cell; or,
  an interval between a minimum delay of signals of a neighbor cell group corresponding to the SMTC information and the signal delay of the current cell.

15. The terminal device according to claim 14, wherein when the positioning capability fails to meet the requirement, a start time of the SMTC window is a time indicated by first start time offset information in the SMTC information.

16. The terminal device according to claim 14, wherein when the positioning capability fails to meet the requirement, a duration of the SMTC window is a duration indicated by first duration information in the SMTC information.

17. The terminal device according to claim 16, wherein the SMTC information further comprises second duration information, the duration indicated by the first duration information is longer than a duration indicated by the second duration information, and the second duration information is used to indicate a duration of the SMTC window when the positioning capability meets the requirement.

18. The terminal device according to claim 15, wherein the SMTC information is used to configure the following types of SMTC windows:
  a SMTC window corresponding to a frequency point, or
  a SMTC window corresponding to a neighbor cell, or
  a SMTC window of a neighbor cell group.

* * * * *